(12) United States Patent
Kuroda et al.

(10) Patent No.: US 7,808,965 B2
(45) Date of Patent: Oct. 5, 2010

(54) MEDIUM ACCESS CONTROL METHOD AND SYSTEM

(75) Inventors: Gou Kuroda, Izumisano (JP); Akio Kurobe, Tondabayashi (JP); Koji Ikeda, Kadoma (JP); Kensuke Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 539 days.

(21) Appl. No.: 11/976,270

(22) Filed: Oct. 23, 2007

(65) Prior Publication Data

US 2008/0062956 A1 Mar. 13, 2008

Related U.S. Application Data

(62) Division of application No. 10/845,505, filed on May 14, 2004, now Pat. No. 7,304,978.

(30) Foreign Application Priority Data

May 16, 2003 (JP) ............................... 2003-139358

(51) Int. Cl.
*H04B 7/212* (2006.01)
(52) U.S. Cl. .................. 370/347; 370/442; 370/468
(58) Field of Classification Search ................. None
See application file for complete search history.

(56) References Cited

U.S. PATENT DOCUMENTS

| | | | |
|---|---|---|---|
| 5,742,239 A | 4/1998 | Siloti | |
| 6,108,314 A | 8/2000 | Jones et al. | |
| 6,331,973 B1 | 12/2001 | Young et al. | |
| 6,363,062 B1 | 3/2002 | Aaronson et al. | |
| 6,393,013 B1 | 5/2002 | Masui et al. | |
| 6,424,645 B1 * | 7/2002 | Kawabata et al. ........... 370/347 |
| 6,532,226 B1 * | 3/2003 | Lehtinen et al. ............ 370/347 |
| 6,778,557 B1 | 8/2004 | Yuki et al. | |
| 6,778,577 B2 | 8/2004 | Ash et al. | |
| 6,798,761 B2 | 9/2004 | Cain et al. | |
| 6,975,641 B1 | 12/2005 | Kurobe et al. | |

(Continued)

FOREIGN PATENT DOCUMENTS

EP 1 408 658 4/2004

(Continued)

OTHER PUBLICATIONS

European Search Report, issued Jan. 29, 2008 in European application EP07023632.

(Continued)

*Primary Examiner*—Bob A Phunkulh
(74) *Attorney, Agent, or Firm*—Wenderoth, Lind & Ponack, L.L.P.

(57) ABSTRACT

A medium access control method is provided in which a control station transmits one specific frame to terminal stations, thereby arranging a schedule of a data transmission time of the control station and each of the terminal stations and allowing a time zone unused by a station for data transmission to be allocated to another station. The control station transmits a schedule frame having defined therein a time occupied by each of the terminal stations, thereby reducing overhead. Also, the completion of the preceding communication performed by another station is detected, thereby effectively using an idle time of a medium and improving transmission efficiency.

9 Claims, 26 Drawing Sheets

| HEADER | REPETITION TIME | ALLOCATION 1 | | ALLOCATION 2 | | ALLOCATION 3 | | ... |
|---|---|---|---|---|---|---|---|---|
| | | STATION IDENTIFIER | TRANSMISSION TIME INFORMATION | STATION IDENTIFIER | TRANSMISSION TIME INFORMATION | STATION IDENTIFIER | TRANSMISSION TIME INFORMATION | |

U.S. PATENT DOCUMENTS

| | | |
|---|---|---|
| 7,016,318 B2 | 3/2006 | Pankaj et al. |
| 7,016,333 B1 * | 3/2006 | Kokudo ............... 370/337 |
| 7,068,639 B1 | 6/2006 | Varma et al. |
| 7,200,155 B2 * | 4/2007 | Umayabashi et al. ...... 370/468 |
| 7,330,877 B2 | 2/2008 | Kandala |
| 2002/0071449 A1 | 6/2002 | Ho et al. |
| 2002/0090004 A1 * | 7/2002 | Rinchiuso ............... 370/468 |
| 2002/0101874 A1 | 8/2002 | Whittaker et al. |
| 2003/0021254 A1 | 1/2003 | Fukuda |
| 2005/0094614 A1 | 5/2005 | Cheng |

FOREIGN PATENT DOCUMENTS

| | | |
|---|---|---|
| JP | 9-55693 | 2/1997 |
| JP | 9-205454 | 8/1997 |
| JP | 2001-333067 | 11/2001 |
| JP | 2002-158676 | 5/2002 |
| TW | 233285 | 5/2005 |
| TW | 233286 | 5/2005 |
| TW | 234406 | 6/2005 |
| TW | 235306 | 7/2005 |
| WO | 99/38292 | 7/1999 |
| WO | 00/70572 | 11/2000 |

OTHER PUBLICATIONS

R Fantacci et al., "Scheduling algorithms for packet-oriented MAC protocols in wireless multimedia systems", *Wireless Personal Communications*, vol. 24, pp. 363-388, 2003.

International Search Report dated Sep. 27, 2004 issued in the International Application No. PCT/JP2004/006791.

L. W. Lim et al., "A QoS Scheduler for IEEE 802.11e WLANs", Consumer Communications and Networking Conference, 2004. CCNC 2004, First IEEE Jan. 5-8, 2004, pp. 199-204.

* cited by examiner

FIG. 4

| HEADER | ALLOCATION 1 | | ALLOCATION 2 | | ALLOCATION 3 | | ALLOCATION 4 | |
|---|---|---|---|---|---|---|---|---|
| | STATION IDENTIFIER | TRANSMISSION TIME INFORMATION | STATION IDENTIFIER | TRANSMISSION TIME INFORMATION | STATION IDENTIFIER | TRANSMISSION TIME INFORMATION | STATION IDENTIFIER | TRANSMISSION TIME INFORMATION |

FIG. 5

| HEADER | ALLOCATION 1 | ALLOCATION 2 | | ALLOCATION 3 | | ALLOCATION 4 | |
|---|---|---|---|---|---|---|---|
| | 11 T3 | 22 | T5 | 21 | T7 | 23 | T9 |

F I G. 6

| HEADER | ALLOCATION 1 | | ALLOCATION 2 | | ALLOCATION 3 | | ALLOCATION 4 | |
|---|---|---|---|---|---|---|---|---|
| | 1 1 | T2 | 2 2 | T4 | 2 1 | T6 | 2 3 | T8 |

FIG. 10

| HEADER | ALLOCATION 1 | | ALLOCATION 2 | | ALLOCATION 3 | | ALLOCATION 4 | |
|---|---|---|---|---|---|---|---|---|
| | S0 | T3 | S1 | T5 | S2 | T7 | S3 | T9 |

FIG. 11

| HEADER | ALLOCATION 1 | | ALLOCATION 2 | | ALLOCATION 3 | | ALLOCATION 4 | |
|---|---|---|---|---|---|---|---|---|
| | S0 | T2 | S1 | T4 | S2 | T6 | S3 | T8 |

FIG. 12

| HEADER | ALLOCATION 1 | | ALLOCATION 2 | | ALLOCATION 3 | | ALLOCATION 4 | |
|---|---|---|---|---|---|---|---|---|
| | S0 | a | S1 | b | S2 | c | S3 | d |

FIG. 13

| HEADER | ALLOCATION 1 | | | ALLOCATION 2 | | |
|---|---|---|---|---|---|---|
| | TERMINAL STATION IDENTIFIER | STREAM IDENTIFIER | TRANSMISSION TIME INFORMATION | TERMINAL STATION IDENTIFIER | STREAM IDENTIFIER | TRANSMISSION TIME INFORMATION |

FIG. 14

| HEADER | | | | PAYLOAD |
|---|---|---|---|---|
| TRANSMISSION STATION IDENTIFIER | DESTINATION STATION IDENTIFIER | OTHERS | DATA LENGTH | DATA |

F I G. 17

| HEADER | REPETITION TIME | ALLOCATION 1 | | ALLOCATION 2 | | ALLOCATION 3 | |
|---|---|---|---|---|---|---|---|
| | | STATION IDENTIFIER | TRANSMISSION TIME INFORMATION | STATION IDENTIFIER | TRANSMISSION TIME INFORMATION | STATION IDENTIFIER | TRANSMISSION TIME INFORMATION |

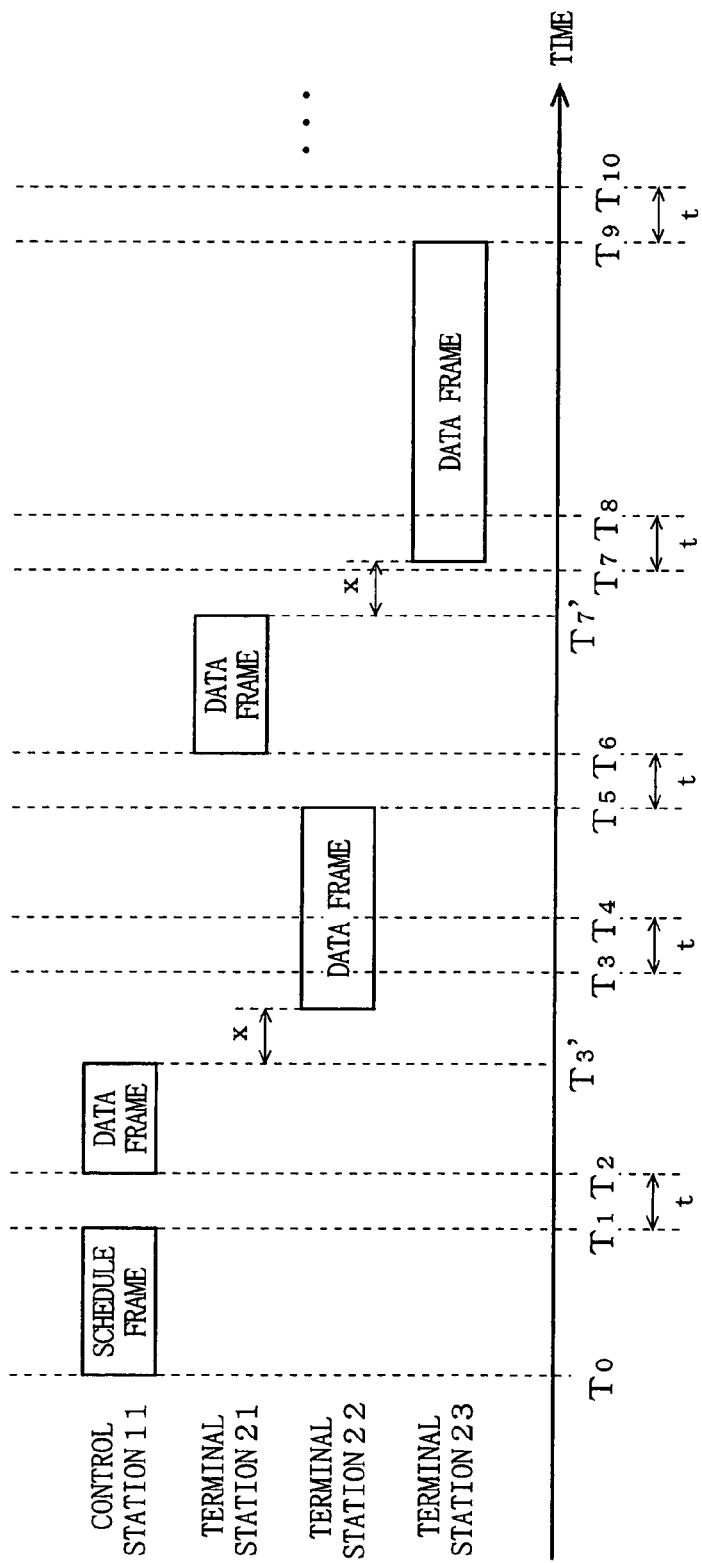

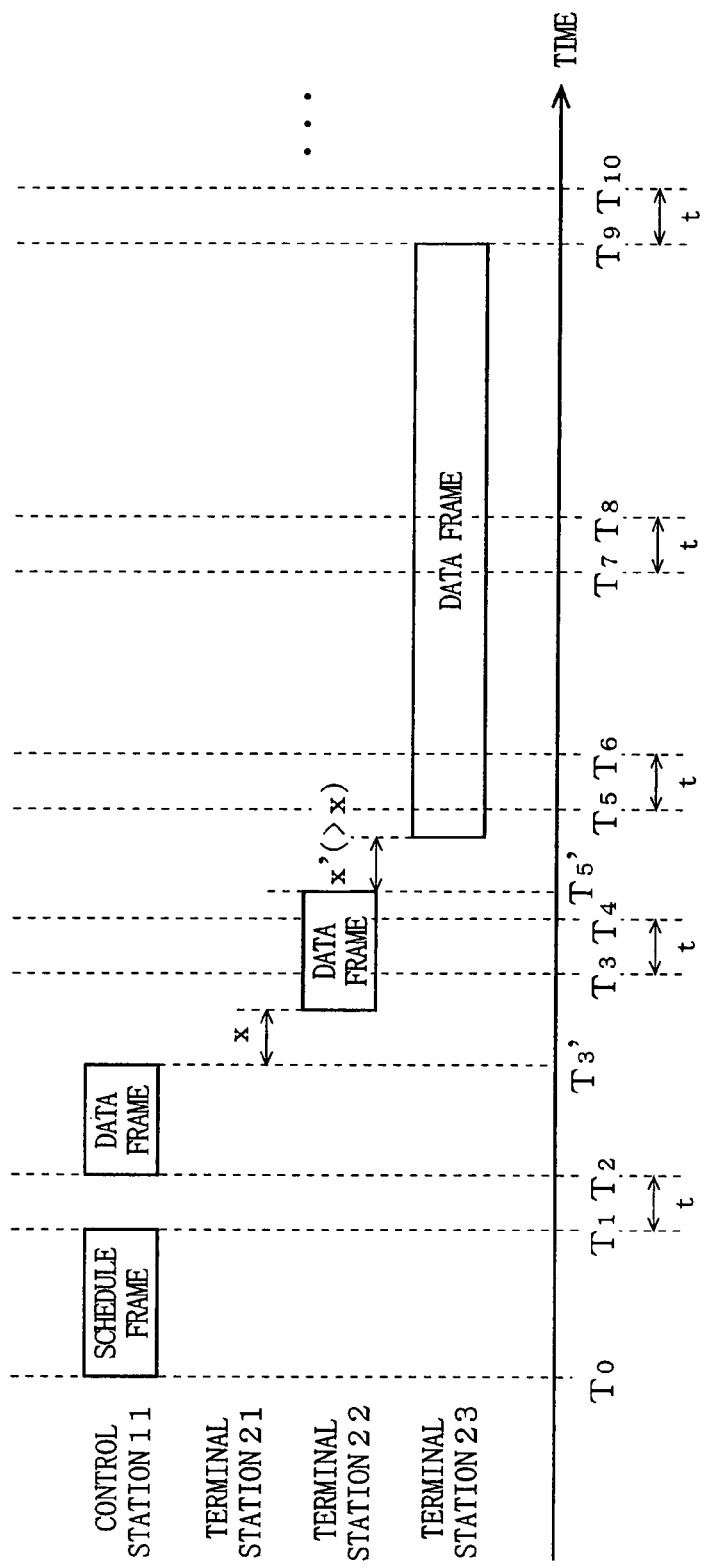

F I G. 2 2

| HEADER | ALLOCATION 1 | | | ALLOCATION 2 | | |
|---|---|---|---|---|---|---|
| | ALLOCATION TYPE | STREAM IDENTIFIER | TRANSMISSION TIME INFORMATION | ALLOCATION TYPE | STREAM IDENTIFIER | TRANSMISSION TIME INFORMATION |

FIG. 24    PRIOR ART
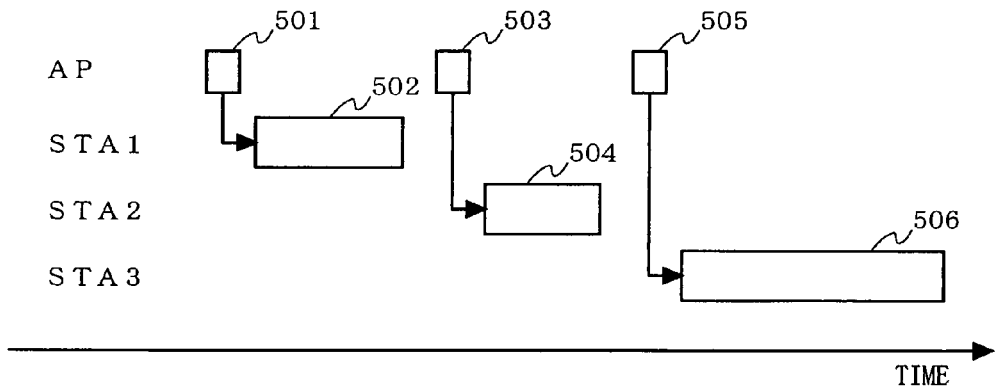
FIG. 25    PRIOR ART
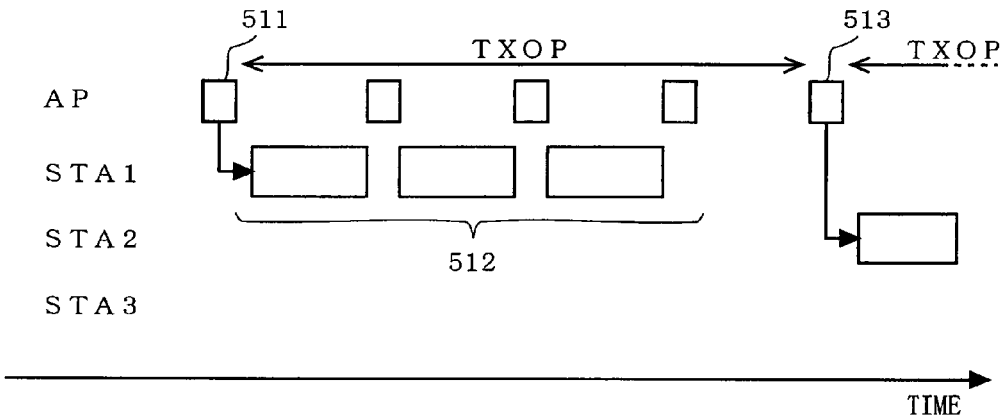
FIG. 26    PRIOR ART
| TRANSMISSION ORDER | TERMINAL | TRANSMISSION TIMING BASED ON TIMING SIGNAL |
|---|---|---|
| 1 | H | AFTER 0msec |
| 2 | I | AFTER 30msec |
| 3 | J | AFTER 120msec |
| 4 | K | AFTER 150msec |

FIG. 27 PRIOR ART

| TRANSMISSION ORDER | TERMINAL | IDLE TIME |
|---|---|---|
| 1 | H | AFTER 5msec |
| 2 | I | AFTER 10msec |
| 3 | J | AFTER 15msec |
| 4 | K | AFTER 20msec |

TERMINAL H SUCCEEDS IN TRANSMISSION ↑

| TRANSMISSION ORDER | TERMINAL | IDLE TIME |
|---|---|---|
| 1 | H | |
| 2 | I | AFTER 5msec |
| 3 | J | AFTER 10msec |
| 4 | K | AFTER 15msec |

MEDIUM ACCESS CONTROL METHOD AND SYSTEM

This is a Rule 1.53(b) Divisional Application of Ser. No. 10/845,505, filed May 14, 2004, now U.S. Pat. No. 7,304,978 which is now allowed.

BACKGROUND OF THE INVENTION

1. Field of the Invention

The present invention relates to medium access control methods and systems. More specifically, the present invention relates to a medium access control method to be used in a network system including a plurality of terminals accessing each other for allowing a specific terminal (control station) to control access of all of the other terminals (terminal stations) in a time division manner, and a medium access control system using the method.

2. Description of the Background Art

In order to achieve a communication network system including a control station for controlling access to a network and terminal stations for accessing the network under the control of the control station, various wireless LAN systems have been put into practical use. Examples of widely-available wireless LAN systems include those complying with the IEEE802.11b standard using the 2.4 GHz band and those complying with the IEEE802.11a standard using the 5 GHz band. Furthermore, the IEEE802.11e standard, which includes the concept of Quality of Service (QoS), has been under planning.

Wireless LANs complying with the IEEE802.11 series define a media access scheme called Point Coordination Function (PCF), which is one of medium access schemes. In this scheme, a control station called Access Point (AP) transmits a polling frame to a terminal station called Station (STA), thereby allowing the terminal station to perform transmission. In detail, refer to IEEE Std 802.11, "Wireless LAN Medium Access Control (MAC) and Physical Layer (PHY) specifications".

FIG. 24 depicts one example of a wireless LAN network including one access point AP and three stations STA1 through STA3 in which PCF medium access is performed. In the example of FIG. 24, AP first transmits a polling frame 501 to STA1 for allowing transmission of a data frame. After STA1 finishes transmitting a data frame 502, AP transmits a polling frame 503 to STA2. In response, STA2 transmits a data frame 504. Thereafter, the same sequence is performed between AP and STA3.

On the other hand, IEEE802.11e defines a medium access scheme called Hybrid Coordination Function (HCF), which is a combination of PCF with the concept of QoS. In detail, refer to *Consumer Communications and Networking Conference, 2004. CCNC 2004. First IEEE*, 5-8, January 2004, "A QoS scheduler for IEEE 802.11e WLANs.

FIG. 25 depicts one example of a wireless LAN network including one access point AP and three stations STA1 through STA3 in which HCF medium access is performed. In the example of FIG. 25, AP first transmits a polling frame 511 to STA1. At this time, a time period during which STA1 can occupy the medium is written in the polling frame. This time period during which a specific STA can occupy the medium is called Transmission Opportunity (TXOP) Within the time period specified by TXOP, STA1 can perform data transmission any number of times (a plurality of pieces of data 512) Upon expiration of TXOP, AP specifies another TXOP to transmit a polling frame 513 to STA2. By repeating this series of processes, the time period during which each STA can occupy the medium can be specified.

On the other hand, in another technology, a control station transmits a frame (timing signal) including communication timing information to each terminal station in the network, thereby specifying a time period during which each terminal station can occupy a communication medium. Examples of such technology are disclosed in Japanese Patent Laid-Open Publication No. 9-205454 (herein after, a first document) and Japanese Patent Laid-Open Publication No. 2001-333067 (herein after, a second document).

Particularly, in the second document, each terminal station in the network performs communication based on the timing defined by the control station in a timing signal while performing carrier detection, thereby further improving transmission efficiency. Specifically, in the second document, as shown in an example of FIG. 26, a transmission start time of each station is defined based on the order of transmission. In FIG. 26, it is defined that a terminal station H in the first transmission order starts transmission immediately after receiving the timing signal, a terminal station I in the second transmission order starts transmission 30 msec thereafter, a terminal station J in the third transmission order starts transmission 120 msec thereafter, and a terminal station K in the fourth transmission order starts transmission 150 msec thereafter. Furthermore, as exemplarily shown in FIG. 27, an idle time until each terminal station starts transmission is defined for each terminal station in accordance with the transmission order so as to specify the transmission order even if a communication time of a specific terminal station goes over the scheduled communication time. In FIG. 27 at left, idle times for the terminal stations H through K in the first through fourth transmission orders are set as 5 msec, 10 msec, 15 msec, and 20 msec, respectively.

However, in this scheme of providing idle times, a terminal station in a lower transmission order is set with a long idle time. This causes reduction in transmission efficiency. Therefore, in the second document, if a specific terminal station has successfully completed normal transmission based on the timing signal, the idle times of the other terminal stations lower in order than the specific terminal station are moved up one by one for resetting, thereby avoiding reduction in transmission efficiency in normal transmission (refer to FIG. 27 at right).

As described above, in the conventional communication network system, an available time period for transmission is defined for each terminal station, thereby achieving highly-efficient data transmission.

However, the above-described scheme of performing polling has two problems. Firstly, a polling frame has to be transmitted to each terminal station separately, thereby increasing overhead. Particularly, when transmission data of each terminal station is small or when it takes relatively long time to transmit a polling frame, transmission efficiency is sharply decreased because polling frame transmission has to be performed a large number of times. In IEEE80211, a plurality of transmission modes are defined. However, in order to allow the receiving terminal to detect the transmission mode in use, the transmission mode of the lowest speed is always used for the header portion of a polling frame. An increase in the number of times the polling frame transmission not accompanying data transmission is performed means an increase the number of times the low-speed header transmission is performed. Consequently, transmission efficiency is decreased.

Secondly, when TXOP in IEEE 802.11e is fixedly allocated, even if a terminal station uses only a part of the allocated time period for communication, for example, another terminal station cannot use the unused time period (idle time) for communication. In wireless communication (e.g. IEEE802.11e) and electrical line communication using the household power line, the state of the transmission path is not stable, thereby frequently causing transmission path errors in the transmitted frames. In one scheme for mitigating such transmission errors, a sender station transmits a predetermined amount of data in advance, a receiver station stores the data using a buffer or the like, and a frame having an error is retransmitted while processing the data in the buffer in the receiver station. However, this scheme is useless if data delay occurs more than the capacity of the buffer. This is because, even if the amount of data stored in the buffer of one terminal station is reduced after processing some portion of the data and it is desired to recover the amount of data in the buffer, a time period allocated to another terminal station cannot be used for this recovery.

Furthermore, the scheme disclosed in the second document has the following problem. That is, the idle time set in the second document is an extra time which is originally not required if normal transmission can be successfully completed. Therefore, even with the idle times set in the terminal stations being moved up one by one for resetting if normal transmission has been successfully completed by a specific terminal station, it is not possible to start transmission before the time allocated based on the timing signal (refer to FIG. 26). That is, the time period supposed to be used by a specific terminal station can never be used by another terminal station.

Therefore, an object of the present invention is to provide a medium access control method and system for scheduling a data transmission time period of each terminal station by transmitting one specific frame from a control station to each terminal station and for allowing a time period unused by a terminal station for data transmission to be allocated to another terminal station.

SUMMARY OF THE INVENTION

One aspect of the present invention is directed to, in a communication network system including a control station for controlling access to a network and one or more terminal stations for accessing the network under the control of the control station, a medium access control method for controlling network access by using a time division technique. The medium access control method of the present invention causes the control station and the terminal stations to perform steps described below.

The method causes the control station to perform steps including: a step of generating, for a plurality of communications performed in the network, a transmission schedule allocating a time zone usable for each of the communications; a step of generating one schedule frame by collecting the generated transmission schedules; a step of transmitting the generated schedule frame to the plurality of the terminal stations, and a step of performing a communication in a time zone which is allocated to the control station.

The method causes each of the plurality of terminal stations to perform steps including: a step of receiving the schedule frame transmitted by the control station; a step of determining, based on the received schedule frame, a terminal station's own time zone in which communication can be performed; and a step of performing the communication in the determined time zone.

The control station may transmit the schedule frame in a broadcast manner or a multicast manner. Furthermore, typically, transmission of this schedule frame is performed in predetermined cycles.

The transmission schedule may include information indicative of time zones in which data is allowed to be transmitted, the time zones respectively being allocated to the plurality of the terminal stations. Alternatively, the transmission schedule may include information indicative of time zones in which data is allowed to be transmitted, the time zones respectively being allocated to either one of sessions and connections between the stations including the control station and the plurality of terminal stations. In the time zone in which data is allowed to be transmitted, each of the terminal stations can perform data transmission using either one of time division multiplex (TDM), frequency division multiplex (FDM), and code division multiplex (CDM).

In order to improve transmission efficiency, it is preferable to further include steps performed by the control station and each of the plurality of terminal stations of: monitoring by a station a state of transmission of another station; detecting that communication is not performed by the other station in the time zone allocated by the transmission schedule or that communication has been completed by the other station before an end time allocated by the transmission schedule; and starting the station's own transmission earlier than scheduled by using an unused time zone of the other station in response to the detection results in the detecting step.

Alternatively, it is preferable to further include steps performed by the control station and each of the plurality of terminal stations of: transmitting a predetermined report frame when no communication is performed in the time zone allocated by the transmission schedule or when communication has been completed before an end time allocated by the transmission schedule; and upon reception by a station of the report frame from another station that is scheduled to perform a transmission immediately before a time zone which the station can perform transmission, starting the station's own transmission earlier than scheduled by using an unused time zone of the other terminal station.

In either case for improving transmission efficiency, note that the step of starting the station's own transmission earlier than scheduled is omitted when it is necessary to access the network in a specific timing.

Furthermore, the schedule frame may have described therein a number of times of repetition indicative of how many more times the same schedule frame is successively and cyclically transmitted. With this, when the schedule frame cannot be received in a time period based on the number of times of repetition, each of the terminal stations can determine, based on the schedule frame last received, a terminal station's own time zone in which communication can be performed.

The above-described medium access control method can be achieved by hardware with a plurality of functional blocks. These functional blocks may be achieved by an LSI. Also, the medium access control method may be provided in a form of a program for causing a computer to perform a series of processes. This program may be introduced as being recorded on a computer-readable recording medium.

As described above, according to the present invention, transmission timings of the plurality of the terminal stations are managed and controlled by the single schedule frame. This makes it possible to substantially reduce overhead of control frames compared with the conventional scheme of transmitting a polling frame a plurality number of times. Also, according to the medium access control system of the present invention, transmission timings of a plurality of streams transmitted by a station can be managed and controlled by the single schedule frame. This allows the transmission control with not only each station but with each stream. Therefore, it is possible to quickly cope with the case where the practical-transmission rate is decreased due to communication failure.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4 through 7 are illustrations showing examples of the structure of a schedule frame to be transmitted by the control station.

FIGS. 9 through 13 are illustrations showing other examples of the structure of the schedule frame to be transmitted by the control station.

FIGS. 14 and 15 are illustrations showing examples of the structure of a data frame to be transmitted by each of the terminal stations.

FIG. 17 is an illustration showing another example of the structure of the schedule frame to be transmitted by the control station.

FIGS. 19A and 19B are timing charts for describing examples of transmission timings in which the control station and the terminal stations transmit a data frame in the medium access control system according to the second embodiment.

FIG. 22 is an illustration regarding a transmission timing advancing process performed by the medium access control system according to the second and third embodiments.

FIG. 24 is an illustration showing one example of conventional data transmission using PCF.

FIG. 25 is an illustration showing one example of conventional data transmission using HCF.

FIGS. 26 and 27 are illustrations for describing a conventional transmission timing control scheme.

DESCRIPTION OF THE PREFERRED EMBODIMENTS

Figure 1:
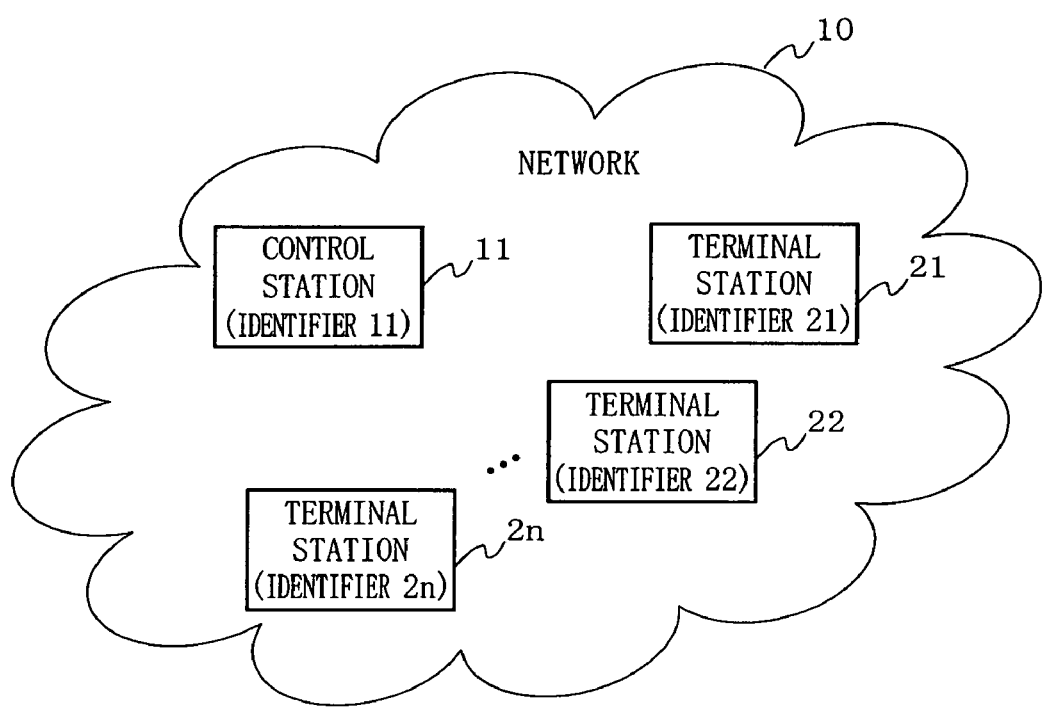
FIG. 1 is an illustration showing a network configuration of a medium access control system according to all embodiments of the present invention.

First, with reference to FIG. 1, a general outline of medium access control systems according to all embodiments of the present invention is described below. In FIG. 1, the medium access control system of the present invention includes a control station 11 controlling access to a network 10 and a plurality of terminal stations 21 through 2n (n is an integer of 2 or larger) accessing the network 10 under the control of the control station 11. The control station 11 and the terminal stations 21 through 2n each have a unique identifier and, based on the identifier, communicate with each other in the network 10.

Now, description is made to a scheme used by the control station 11 for managing a transmission schedule of the terminal stations 21 through 2n, the scheme being a feature of the present invention.

First Embodiment

Figure 2:
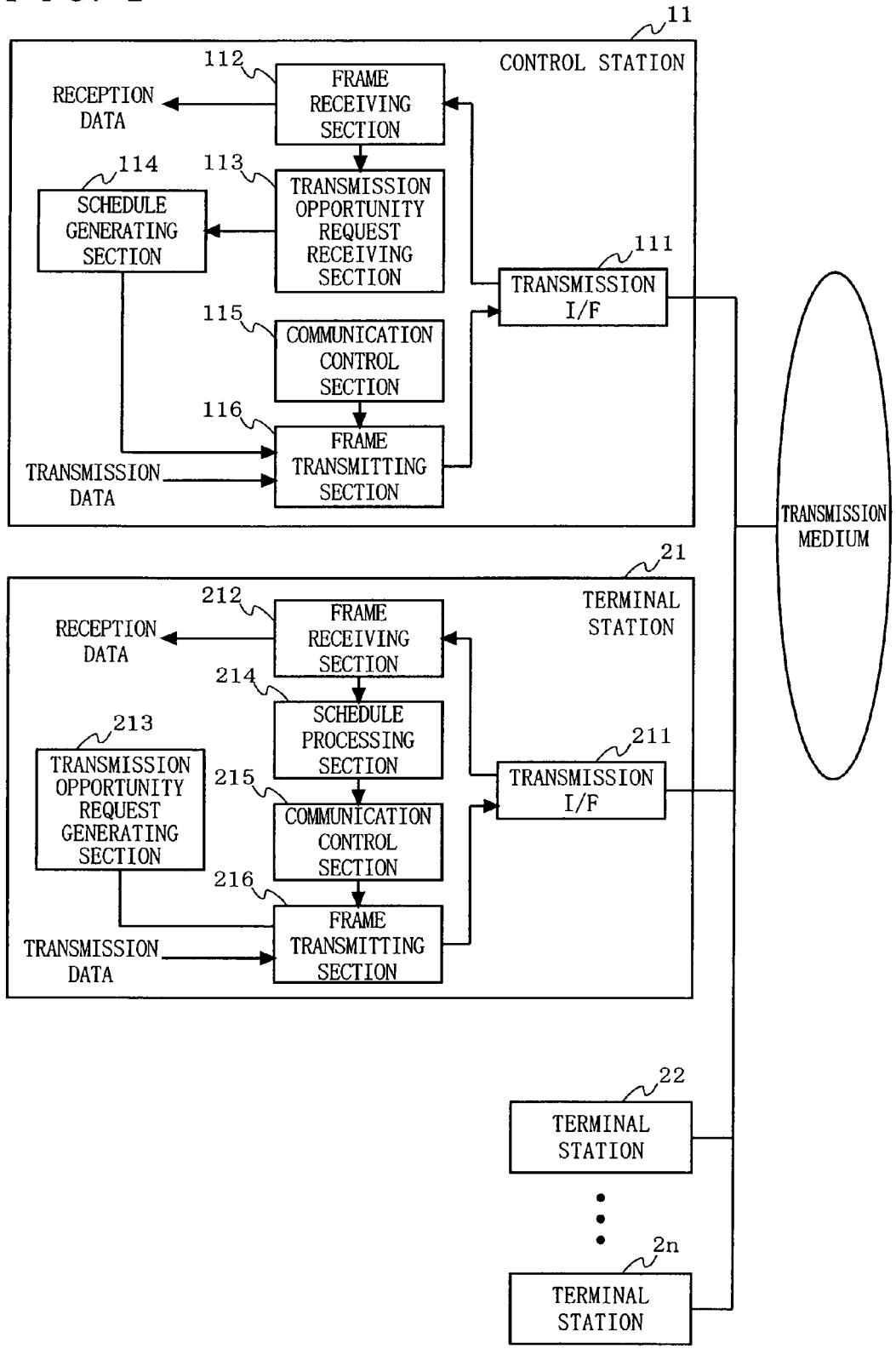
FIG. 2 is an illustration showing a detailed configuration of a medium access control system according to a first embodiment of the present invention.

FIG. 2 is an illustration showing a detailed configuration of a medium access control system according to a first embodiment of the present invention. In FIG. 2, the control station 11 includes a transmission interface (I/F) 111, a frame receiving section 112, a transmission opportunity request receiving section 113, a schedule generating section 114, a communication control section 115, and a frame transmitting section 116. The terminal station 21 includes a transmission interface (I/F) 211, a frame receiving section 212, a transmission opportunity request generating section 213, a schedule processing section 214, a communication control section 215, and a frame transmitting section 216. The other terminal stations 22 through 2n each have a structure identical to that of the terminal station 21.

First, the structure of each of the control station 11 and the terminal stations 21 through 2n is schematically described below.

In the control station 11, the transmission interface 111 transmits a frame to a transmission medium and receives a frame from the transmission medium. The frame receiving section 112 performs a receiving process on the frame received through the transmission interface 111. The transmission opportunity request receiving section 113 receives a transmission opportunity request from the frame receiving section 112 and then passes information required for schedule generation to the schedule generating section 114. The schedule generating section 114 generates a schedule for specifying timings in which the terminal stations 21 through 2n access the network 10, and then transmits the schedule to the transmission interface 111. Also, upon reception of a new transmission opportunity request from the transmission opportunity request receiving section 113, the schedule generating section 114 changes the schedule. The communication control section 115 determines a timing in which a schedule frame is transmitted and, when its own control station transmits a data frame, determines a transmission timing based on the schedule. The frame transmitting section 116 passes information, such as transmission data and schedule, to the transmission interface 111 thereby performing frame transmission.

In the terminal stations 21 through 2n, the transmission interface 211 transmits a frame to the transmission medium and receives a frame from the transmission medium. The frame receiving section 212 performs a receiving process on the frame received through the transmission interface 211. In accordance with an instruction from another component and an external device, the transmission opportunity request generating section 213 generates information for requesting the control station 11 to give a transmission opportunity, and then passes the generated information to the frame transmitting section 216. The schedule processing section 214 processes a schedule frame passed by the frame receiving section 212 to extract schedule information. The communication control section 215 detects a timing that allows its own terminal station to send a frame in the schedule information extracted by the schedule processing section 214, and then instructs the frame transmitting section 216 to transmit a frame in the allowed timing. The frame transmitting section 216 passes information, such as transmission data and a transmission opportunity request, to the transmission interface 211 thereby performing frame transmission.

Figure 3:
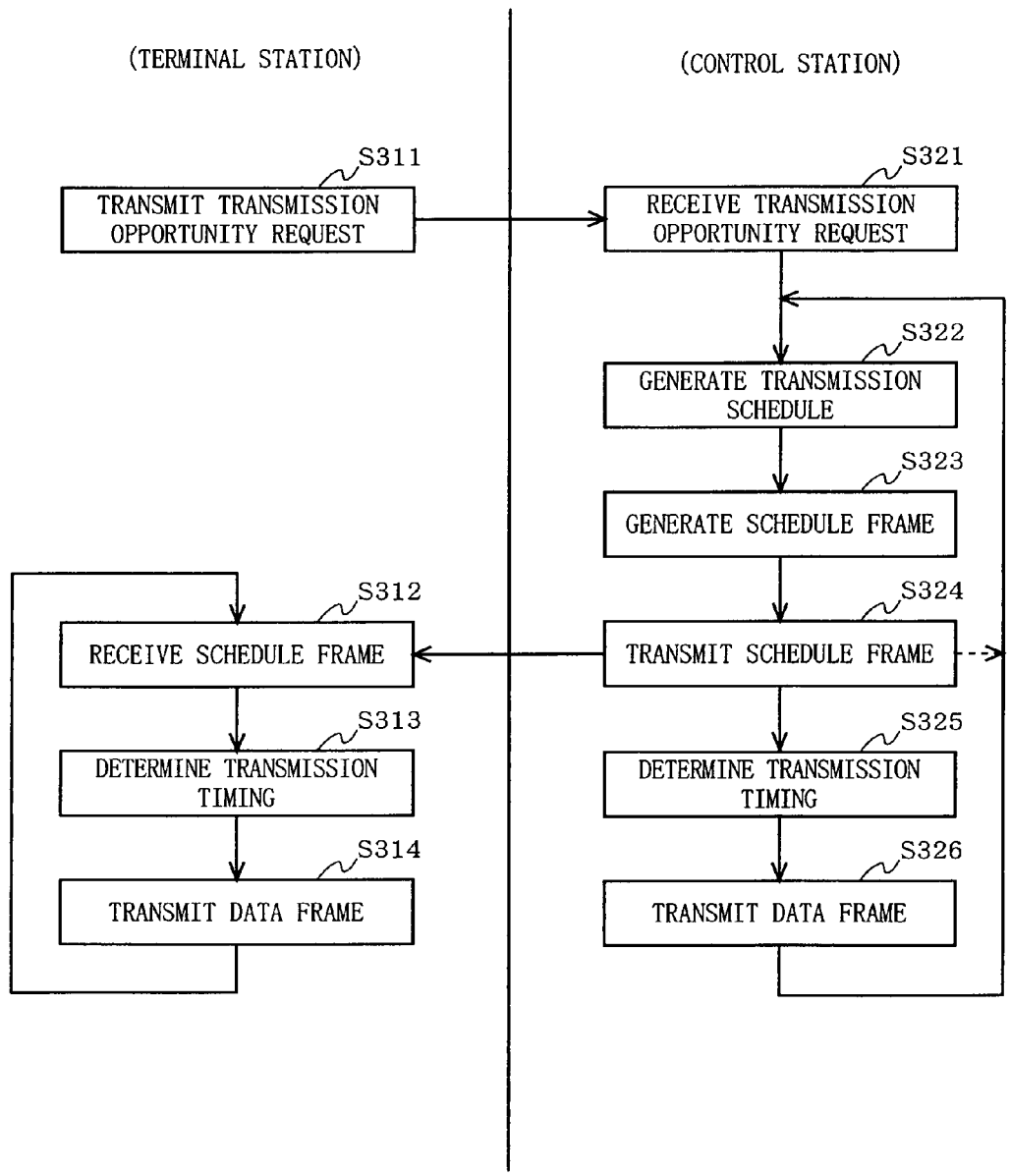
FIG. 3 is a flowchart for schematically describing a procedure performed by a control station 11 and terminal stations 21 to 2n.

Next, a control scheme performed by the medium access control system according to the first embodiment of the present invention is described below. FIG. 3 is a flowchart for schematically describing a procedure performed by the control station 11 and the terminal stations 21 to 2n.

First, the terminal stations 21 through 2n each transmit a request for a transmission opportunity to be given (a transmission opportunity request) to the control station 11 (step S311). Upon reception of the transmission opportunity request received from any of the terminal stations 21 through 2n, the control station 11 generates a transmission schedule for each terminal station based on this transmission opportunity request (steps S321 and S322). The control station 11 then collects the generated transmission schedules to generate a schedule frame (step S323). FIG. 4 depicts one example of a schedule frame for schedule management in units of stations. This schedule frame is a frame having stored therein information specifying a time zone in which the control station 11 and the terminal stations 21 through 2n can access the network 10. The schedule frame includes a header field and zero or more allocation field search having a combination of a station identifier and transmission time information. The header field includes necessary information, such as a preamble for frame synchronization, a frame type, a frame length, and an identifier of the transmission terminal station (not shown). The allocation fields each store a station identifier of the control station or a terminal station for identifying the station and information for reporting a time zone in which the station is allowed to access the network 10, that is, allowed to transmit a data frame.

Here, a value regarding the number of terminal stations for scheduling may be described in the header field, thereby varying the number of allocation fields.

The control station 11 transmits the generated schedule frame in a broadcast manner to all of the terminal stations 21 through 2n or in a multicast manner targeted to a terminal station indicated by the terminal station identifier (step S324). Upon completion of transmission of the schedule frame, the control station 11 determines a transmission timing based on the transmitted schedule (step S325). If the allocation field has allocated therein its transmission time, the control station 11 transmits a data frame at the time given by that field (step S326). On the other hand, each of the terminal stations 21 through 2n receives the schedule frame from the control station 11 (step S312) and, with reference to the terminal station identifier in the allocation field, determines the relevant transmission time information (step S313). After determining the relevant transmission time information, the terminal station refers to transmission information preceding the obtained relevant transmission time information and transmission information subsequent thereto to obtain a time zone allowing a data frame to be transmitted, thereby performing a transmitting process (step S314). In the schedule frame, the control station 11 may allocate a plurality of transmission opportunities for one station to one frame. Also, each of the terminal stations 21 through 2n may perform a plurality of frame transmissions per reception of one schedule frame from the control station 11.

Figure 6:
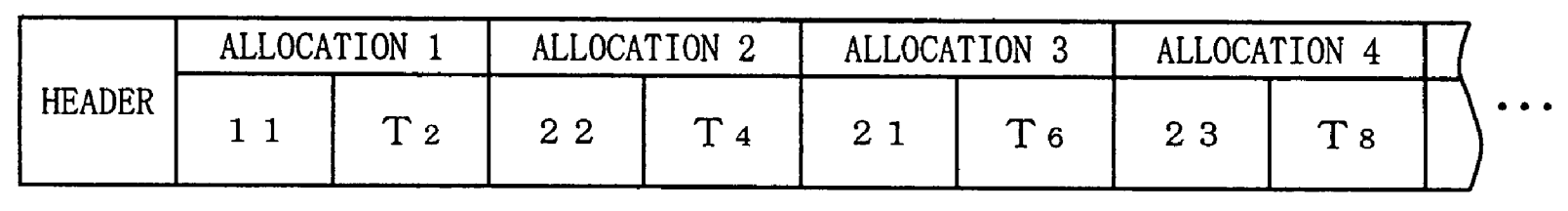
Figure 7:
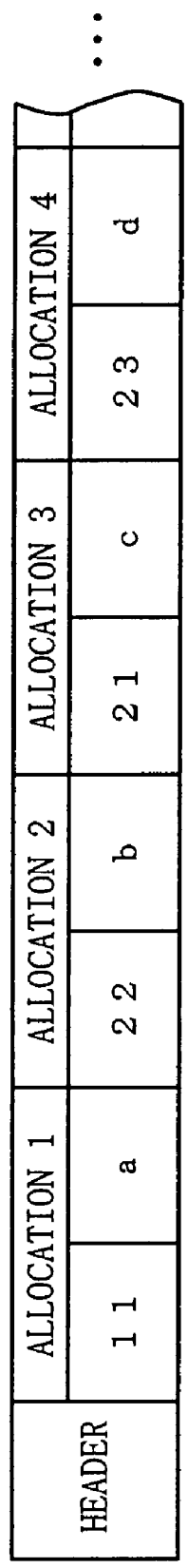
Figure 8:
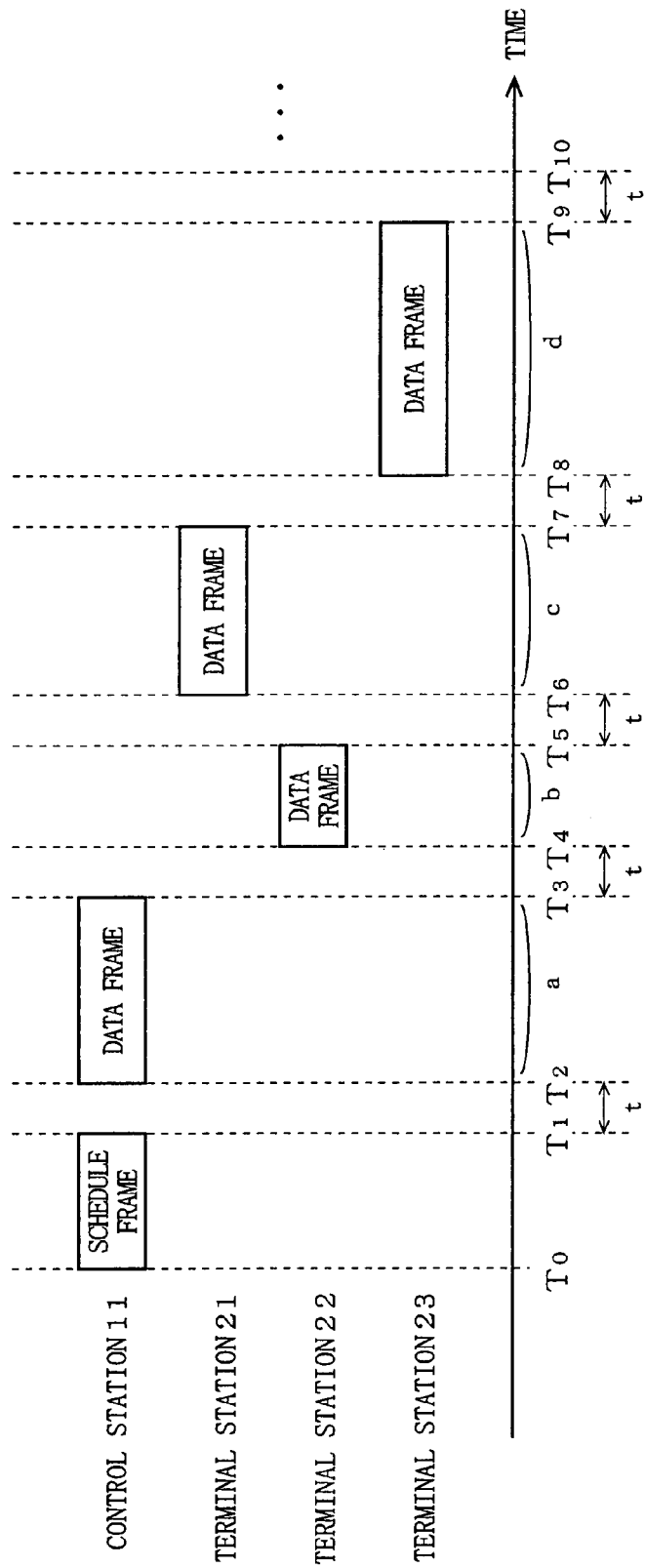
FIG. 8 is a timing chart for describing one example of transmission timings in which the control station and the terminal stations transmit a data frame in the medium access control system according to the first embodiment.

FIGS. 5 through 8 depict examples of specific information stored in each field of the schedule frame shown in FIG. 4. FIG. 5 shows an example in which a transmission end time is set as the transmission time information. FIG. 6 shows an example in which a transmission start time is set as the transmission time information. FIG. 7 shows an example in which a transmission continuation time is set as the transmission time information. Also, FIG. 8 is a timing chart for describing timings in which the control station 11 and the terminal stations 21 through 23 transmit a data frame based on the information shown in FIG. 5.

The control station 11 uses a time period starting at a time T2 when a predetermined time t elapses from the completion of the transmission of the schedule frame and ending at a time T3 indicated in its allocation field to transmit its data frame. Referring to a time T5 indicated in its transmission time information and the time T3 indicated in the control station transmission time field, the terminal station 22 uses a time period starting at a time T4 (=T3+t) and ending at the time T5 to transmit its data frame. The terminal station 21 refers to a time T7 indicated in its transmission time information and the immediately-preceding transmission time information (that is, the time T5), and uses a time period starting at a time T6 (=T5+t) and ending at the time T7 to transmit its data frame. Similarly, the terminal station 23 refers to a time T9 indicated in its transmission time information and the immediately-preceding transmission time information (that is, the time T7) and uses a time period starting at a time T8 (=T7+t) and ending at the time T9 to transmit its data frame. The time t is a margin time predetermined by the control station 11 and the terminal stations 21 through 2n in the network 10, and the length of the time t can be arbitrarily set. Here, in this example, only one data frame transmission is performed in each allocated time. Alternatively, for example, a plurality of data frame transmissions or an acknowledgment frame transmission from the receiving terminal may be performed.

As shown in the example of FIG. 5, when the value set as the transmission time information is a transmission end time, each terminal station refers to the immediately-preceding transmission time information to calculate its data frame transmission allowable time. Also, as shown in the example of FIG. 6, when the value set as the transmission time information is a transmission start time, each terminal station refers to the immediately-subsequent transmission time information to calculate its data frame transmission allowable time. Furthermore, as shown in the example of FIG. 7, when the value set as the transmission time information is a transmission continuation time, each transmission terminal refers to all pieces of transmission time information before its own transmission time information to calculate its data frame transmission allowable time.

Figure 9:
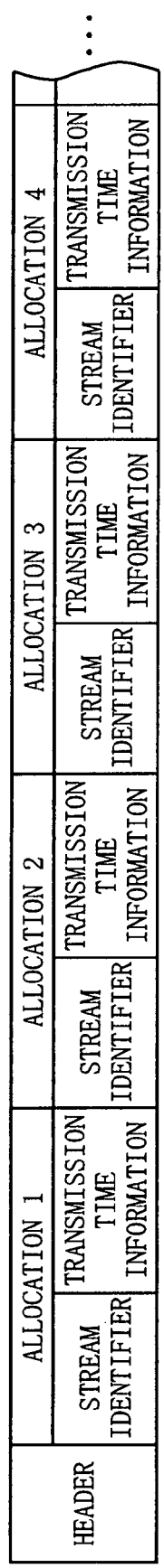
Figure 11:
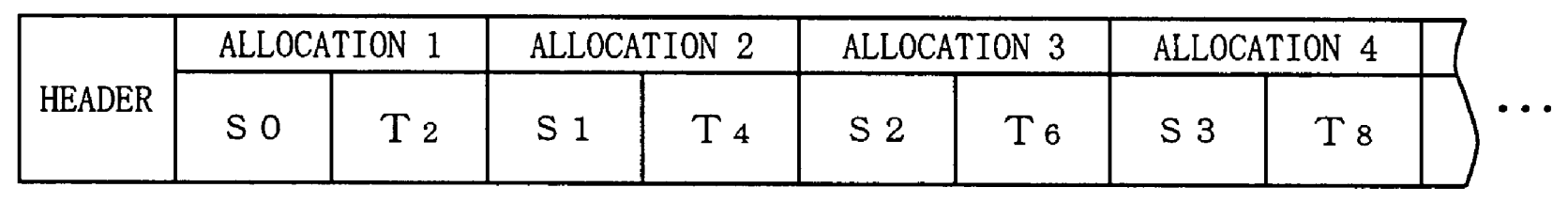
Figure 12:
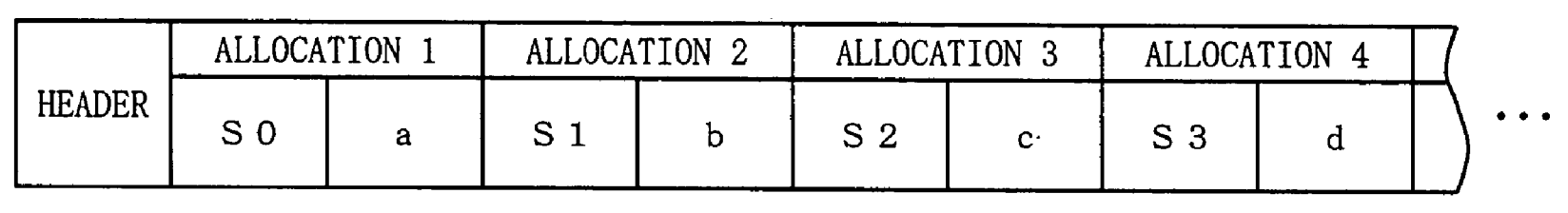

Descriptions have been made to examples of the schedule frame for schedule management in units of stations (FIG. 4). Alternatively, as will be described further below, schedule management can be performed in units of sessions or connections generated between stations, that is, in units of streams. FIG. 9 depicts one example of the schedule frame for schedule management in units of streams. This schedule frame includes a header field, and zero or more allocation fields each having a combination of a stream identifier and transmission time information. The header field is as described above. The allocation fields each store a stream identifier for identifying a stream and information for reporting a time zone in which a data frame in that stream is allowed to be transmitted. Here, the stream identifier has to be unique in the network. FIGS. 10 through 12 show examples of specific information stored in each field of the schedule frame. FIG. 10 shows an example in which a transmission end time is set as the transmission time information. FIG. 11 shows an example in which a transmission start time is set as the transmission time information. FIG. 12 shows an example in which a transmission continuation time is set as the transmission time information. Still alternatively, schedule management can be performed in units of streams by specifying each stream with a station identifier and a stream identifier that is unique in that station. In this case, a schedule frame illustrated in FIG. 13 is used, for example.

Next, the structure of the data frame to be transmitted by the control station 11 and the terminal stations 21 through 2n is described. FIG. 14 shows one example of the structure of a general data frame. In FIG. 14, the header portion of the data frame includes a field for storing an identifier of a transmitting station, a field for storing an identifier of a destination station, a field for storing the length of data attached to a payload portion (data length), and other fields. In the payload portion of the data frame, data having the length indicated by the above data length is stored. Note that error detection code, CRC, and the like attached to an actual communication frame are omitted herein for convenience of description.

Figure 15:
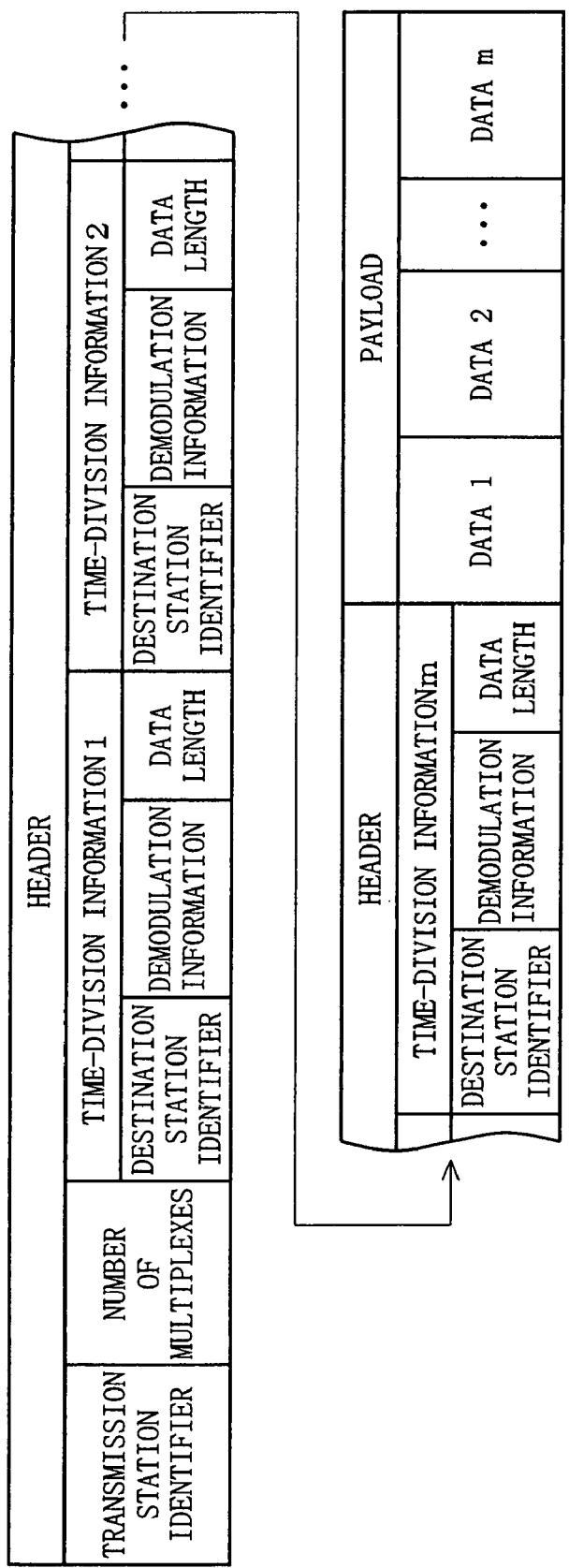

FIG. 15 is an illustration showing one example of the structure of a data frame to be transmitted in a time-division multiplex (TDM) manner. In FIG. 15, the header portion of the data frame includes a field for storing an identifier of a transmitting station, a field for storing the number of multiplexes in time-division information, and a plurality of pieces of time division information each having a combination of a field for storing an identifier of a destination station, a field for storing a data demodulation scheme attached to the payload portion of the data frame, and a field for storing the length of data. In the payload portion, pieces of data respectively corresponding to the plurality of pieces of time-division information are multiplexed. Note that error detection code, CRC, and the like attached to an actual communication frame are omitted herein for convenience of description. With this data frame structure, an arbitrary station can transmit data simultaneously to the other stations in the TDM manner. If a frequency band for use is divided into a plurality of channels and the field shown in FIG. 15 for storing a scheme for demodulating a data frame includes information regarding a channel number, it is possible to simultaneously transmit data to other stations in a frequency division multiplex (FDM) manner. Furthermore, if the field shown in FIG. 15 for storing a scheme for demodulating a data frame includes code information required for demodulation, it is possible to transmit data simultaneously to the other stations in a code division multiplex (CDM) manner.

As described above, according to the medium access control system of the first embodiment of the present invention, transmission timings of the control station and the plurality of the terminal stations are managed and controlled by the single schedule frame. This makes it possible to substantially reduce overhead of control frames compared with the conventional scheme of transmitting a polling frame a plurality number of times based on the number of terminal stations. Also, according to the medium access control system of the present invention, transmission timings of a plurality of streams can be managed and controlled by the single schedule frame. This allows the transmission control with not only each station but with each stream. Therefore, it is possible to quickly cope with the case where the practical transmission rate is decreased due to communication failure.

Figure 16:
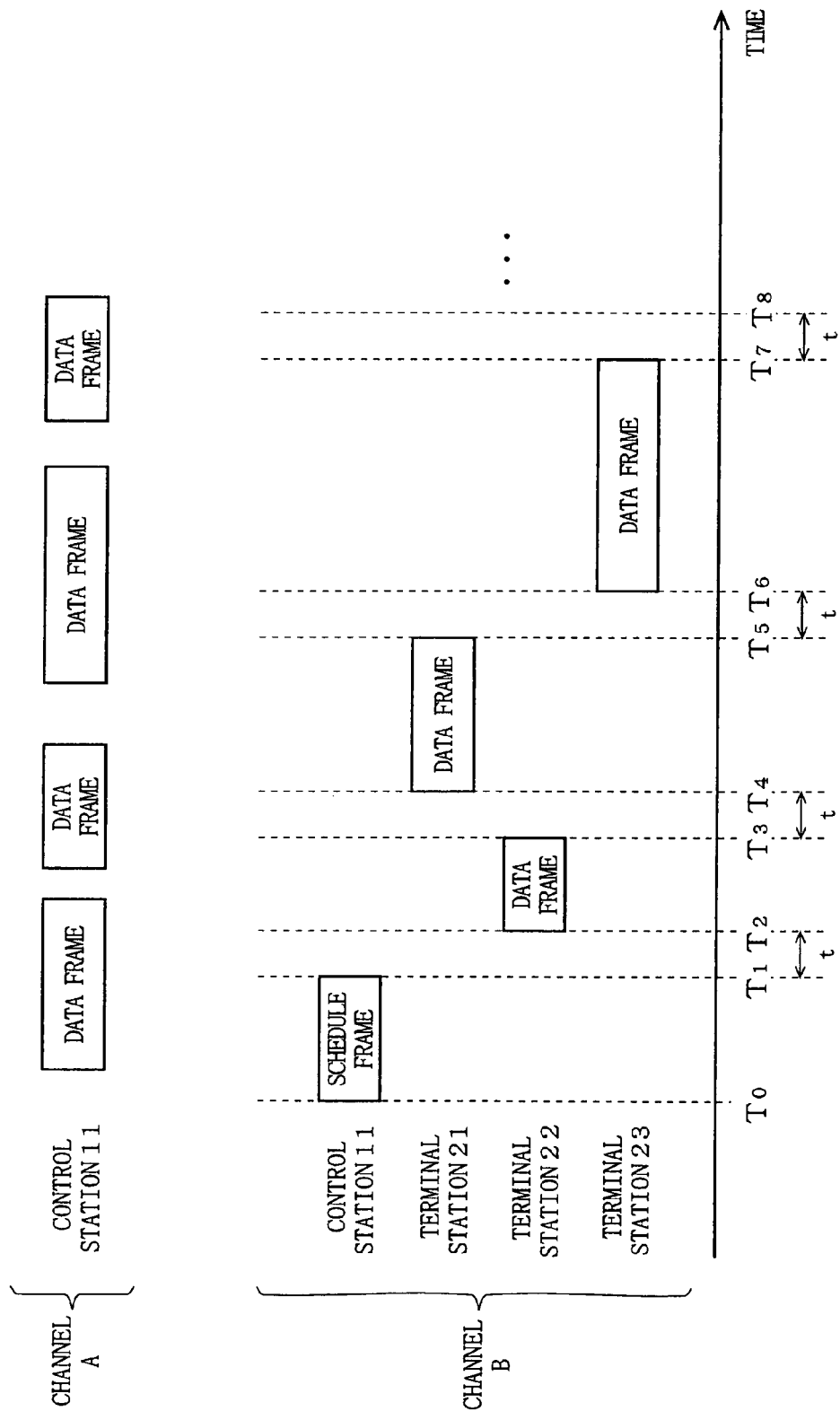
FIG. 16 is a timing chart for describing another example of transmission timings in which the control station and the terminal stations transmit a data frame.

Here, if a channel frequency band to be used by the control station 11 for data frame transmission is different from a channel frequency band to be used by the terminal stations 21 through 2n for data frame transmission, parallel data frame transmission can be made as shown in FIG. 16.

Also, in the present embodiment, the terminal stations 21 through 2n each transmit frames upon reception of the schedule frame according to the received schedule. However, with such schedule control, there may be a terminal station that cannot successfully receive the schedule frame when the communication state is deteriorated, for example. To get around the problem, as shown in FIG. 17, the schedule frame may have set therein a repetition time field indicating how many more times a data frame transmission can be performed based on the schedule frame, that is, how many more times the same schedule frame is supposed to be successively and cyclically transmitted after the current schedule frame is transmitted. For example, when the terminal station receives a schedule frame having set "2" in the repetition time field, even if the communication state is so deteriorated thereafter that a new schedule frame cannot be received, the terminal station can perform data transmission during two schedule frame cycles based on the time indicated by the schedule frame received before the communication state is deteriorated. The value in the repetition time field is decremented every time the control station 11 transmits the schedule frame. Also, if the schedule frame is not supposed to be changed, the value in the repetition time field is set as a fixed value.

Second Embodiment

Figure 18:
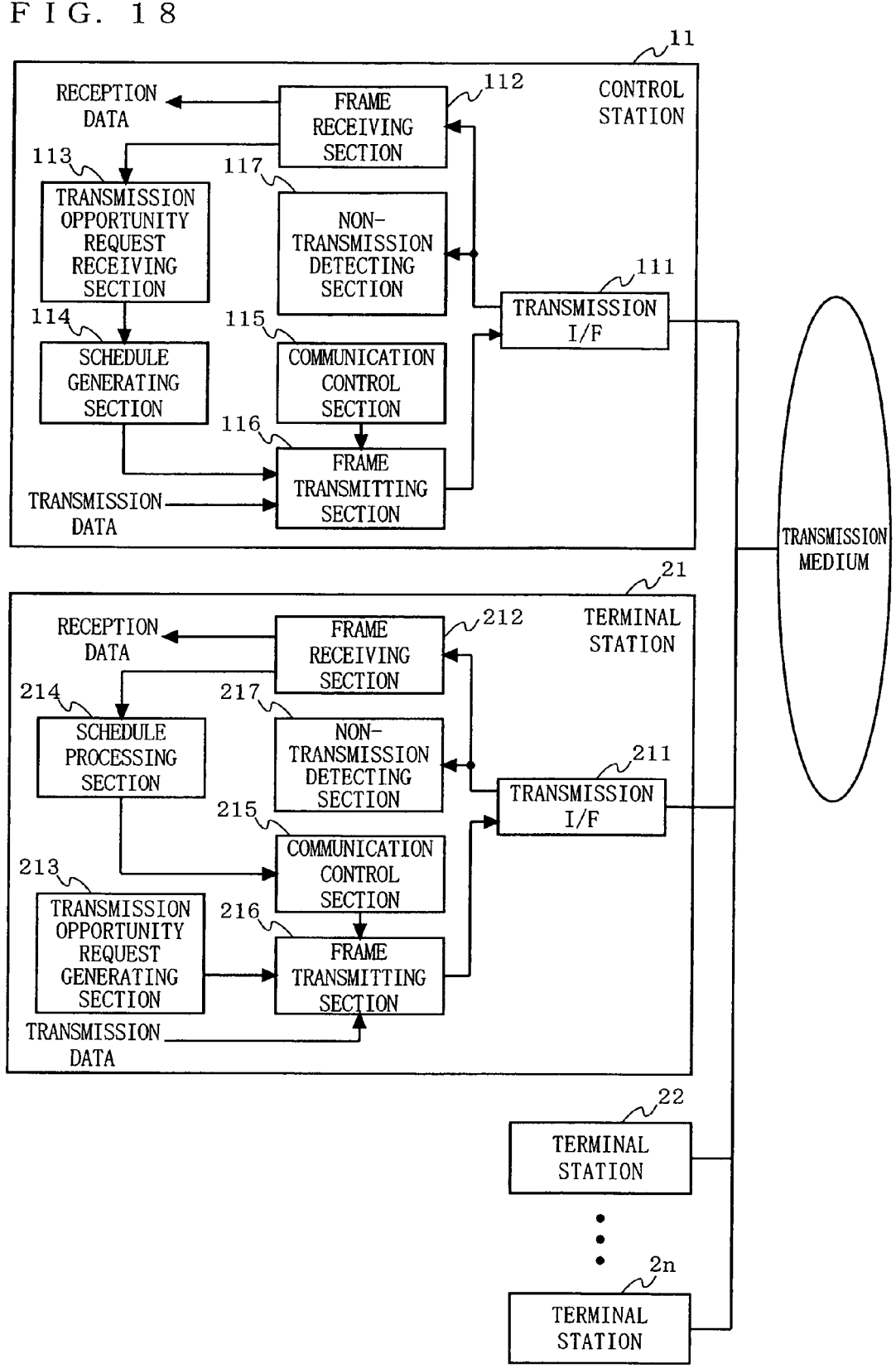
FIG. 18 is an illustration showing a detailed configuration of a medium access control system according to a second embodiment of the present invention.

FIG. 18 is an illustration showing a detailed configuration of a medium access control system according to a second embodiment of the present invention. In FIG. 18, the control station 11 includes the transmission interface 111, the frame receiving section 112, the transmission opportunity request receiving section 113, the schedule generating section 114, the communication control section 115, the frame transmitting section 116, and a non-transmission detecting section 117. The terminal station 21 includes the transmission interface 211, the frame receiving section 212, the transmission opportunity request generating section 213, the schedule processing section 214, the communication control section 215, the frame transmitting section 216, and a non-transmission detecting section 217. The other terminal stations 22 through 2n each have a structure identical to that of the terminal station 21.

As illustrated in FIG. 18, the medium access control system according to the second embodiment of the present invention has the structure in which the control station 11 of the medium access control system according to the first embodiment is further provided with the non-transmission detecting section 117 and the terminal stations 21 through 2n are each further provided with the non-transmission detecting section 217. Hereinafter, description is made to the second embodiment, mainly to the above different points.

The non-transmission detecting sections 117 and 217 monitor the communication state of another station that can transmit frames in the current time zone to detect that the station completes data transmission, and that the station will not transmit frames in the current time zone. Specifically, the non-transmission detecting sections 117 and 217 regard, as the communication-completed point, a time point until which no data frame transmission is performed for a predetermined time period in the time zone allocated to the other station and then detects that time point. That is, what is detected is that communication has been completed earlier than the end time allocated by the schedule frame. Upon detection by then on-transmission detecting sections 117 and 217 of the completion of communication, the communication control sections 115 and 215 starts its data frame transmission earlier than scheduled, thereby effectively using the idle time not used by the other stations.

FIG. 19A is a timing chart showing data frame transmission performed by the control station 11 and the terminal stations 21 through 23 based on the information shown in FIG. 5. In FIG. 19A, the control station 11 completes its data frame transmission at a time T3', which is earlier than the end of its allocated time T3. Therefore, the terminal station 22 monitoring the communication state of the control station 11 determines that the control station 11 completed its communication when a predetermined time x elapsed from the time T3', and then uses a time period starting at a time (T3'+x) and ending at the time T5 for its data frame transmission. Also, the terminal station 21 completes its data frame transmission at a time T7', which is earlier than the end of its allocated time T7. Therefore, the terminal station 23 monitoring the communication state of the terminal station 21 determines that the terminal station 21 completed its communication when the predetermined time x elapsed from the time T7', and then uses a time period starting at a time (T7'+x) and ending at the time T9 for its data frame transmission. This data frame transmission advancing process may be performed such that a data frame transmission of one station is advanced before the allocated time of another station scheduled to perform the immediately-preceding data frame transmission. An exemplary case is as shown in FIG. 19B, in which the terminal station 22 completes its data frame transmission at a time T5' and the terminal station 21 does not perform data frame transmission. Then, the terminal station 23 monitoring the communication state of the terminal station 21 determines that the terminal station 21 will not transmit frames when the predetermined time x' elapses from the time T5', and then uses a time period starting at a time (T5'+x') and ending at the time T9 for its data frame transmission. In this case, note that the value of x' must be larger than the value of x.

As described above, according to the medium access control system of the second embodiment of the present invention, the idle time not being used for communication can be effectively used for improving communication efficiency.

Third Embodiment

Figure 20:
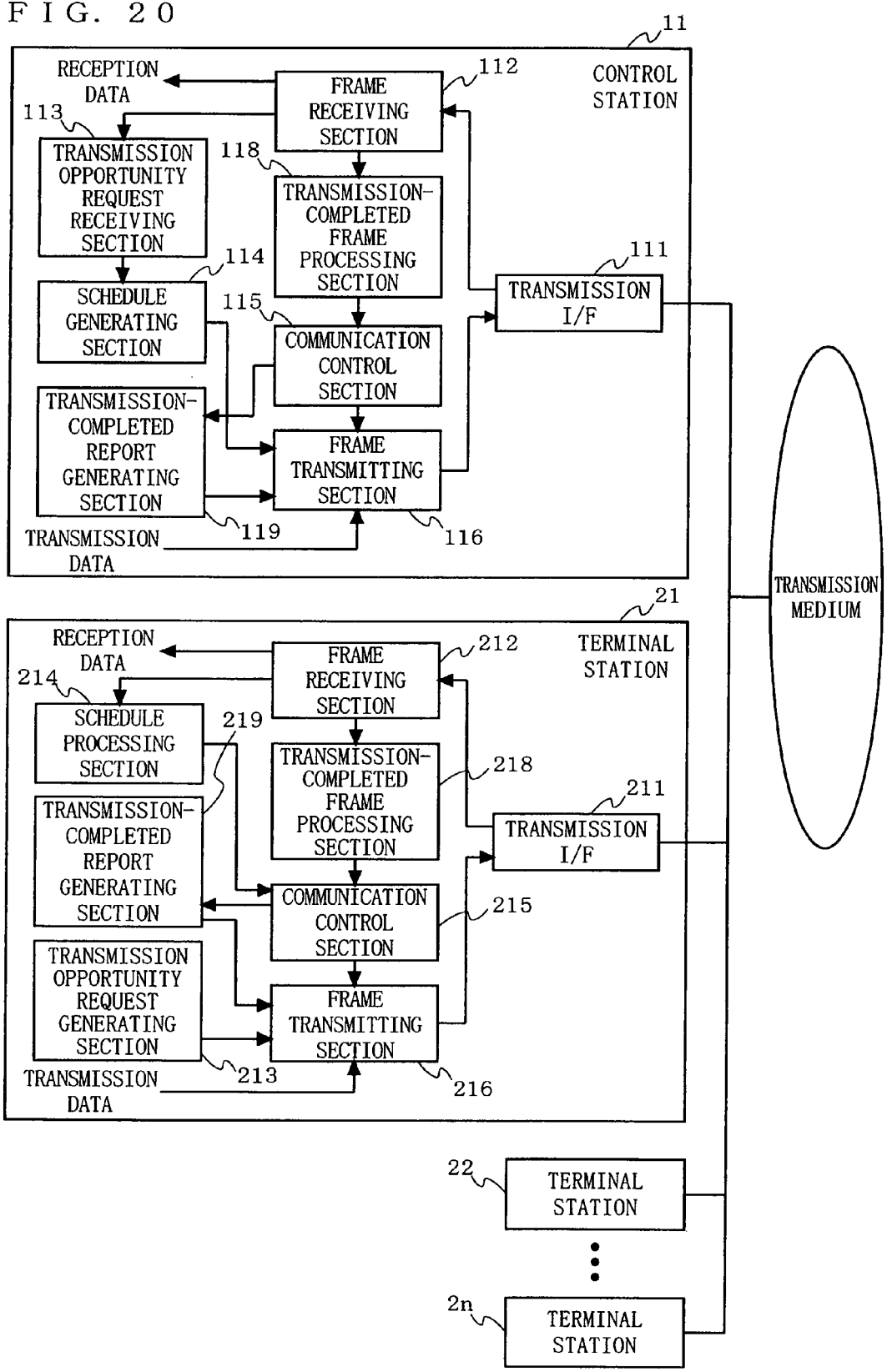
FIG. 20 is an illustration showing a detailed configuration of a medium access control system according to a third embodiment of the present invention.

FIG. 20 is an illustration showing a detailed configuration of a medium access control system according to a third embodiment of the present invention. In FIG. 20, the control station 11 includes the transmission interface 111, the frame receiving section 112, the transmission opportunity request receiving section 113, the schedule generating section 114, the communication control section 115, the frame transmitting section 116, a transmission-completed frame processing section 118, and a transmission-completed report generating section 119. The terminal station 21 includes the transmission interface 211, the frame receiving section 212, the transmission opportunity request generating section 213, the schedule processing section 214, the communication control section 215, the frame transmitting section 216, a transmission-completed frame processing section 218, and a transmission-completed report generating section 219. The other terminal stations 22 through 2n each have a structure identical to that of the terminal station 21.

As illustrated in FIG. 20, the medium access control system according to the third embodiment of the present invention has the structure in which the control station 11 of the medium access control system according to the first embodiment is further provided with the transmission-completed frame processing section 118 and the transmission-completed report generating section 119 and the terminal stations 21 through 2n are each further provided with the transmission-completed frame processing section 218 and the transmission-completed report generating section 219. Hereinafter, description is made to the third embodiment, mainly to the above different points.

If the data frame transmission has been completed within its allocated time zone and a transmission-completed report can be transmitted within the allocated time zone, the transmission-completed report generating sections 119 and 219 generate a predetermined transmission-completed frame for reporting to another station through the frame transmitting sections 116 and 216, respectively, that communication has been completed. This report may be transmitted to all of the other stations in a broadcast manner, or to only a station scheduled to perform framed at a transmission next in a unicast manner. Upon reception of the transmission-completed frame from the station scheduled to perform the immediately-preceding frame data transmission, the transmission-completed frame processing sections 118 and 218 each know that the station transmitting the transmission-completed frame has completed transmission, start its data frame transmission, and bring its own station to forward to start data frame transmission, thereby effectively using the idle time not used by another station.

Figure 21:
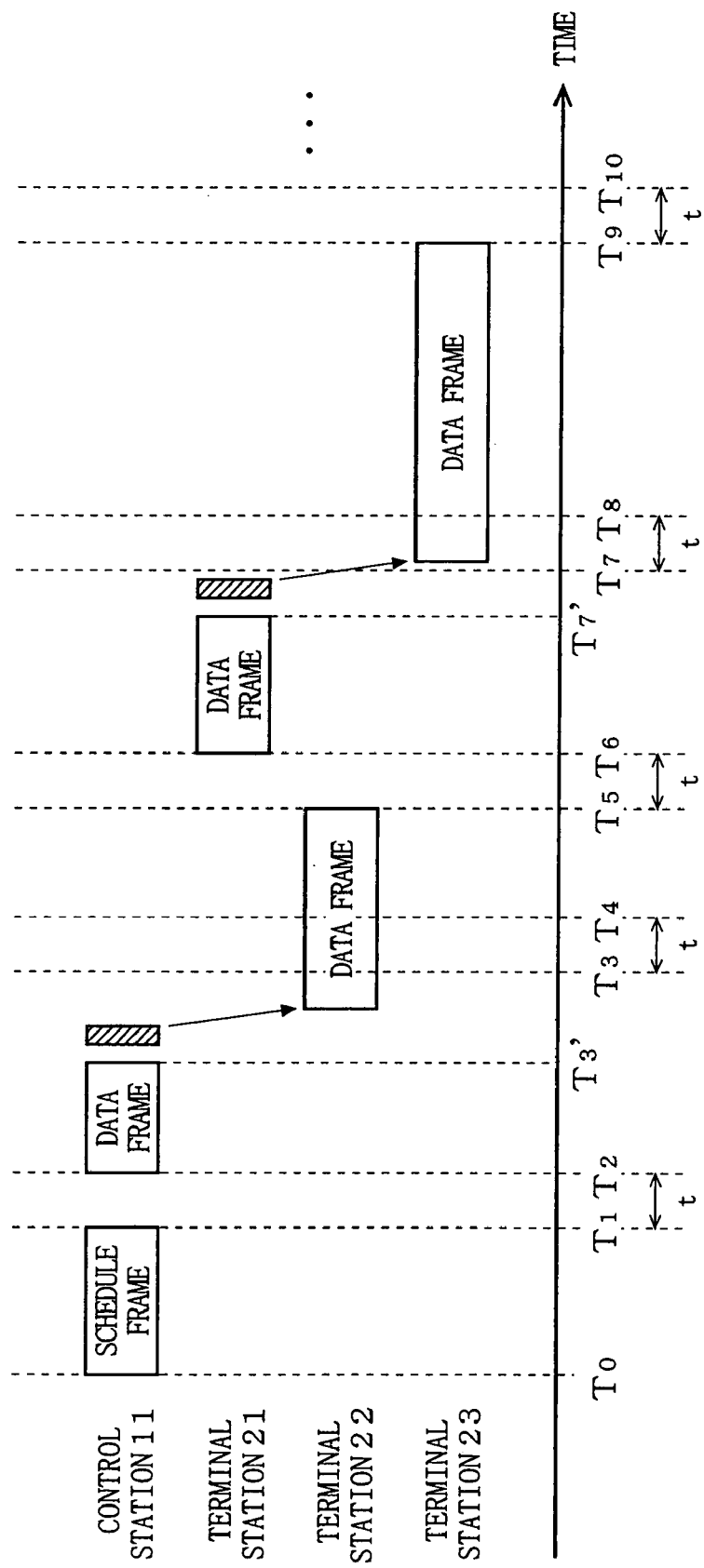
FIG. 21 is a timing chart for describing one example of transmission timings in which the control station and the terminal stations transmit a data frame in the medium access control system according to the third embodiment of the present invention.

FIG. 21 is a timing chart showing data frame transmission performed by the control station 11 and the terminal stations 21 through 23 based on the information shown in FIG. 5. In FIG. 21, the control station 11 completes its data frame transmission at a time T3', which is earlier than the end of its allocated time T3, and then transmits a transmission-completed frame (a diagonally-shaded portion in the drawing) that reports the completion. Upon reception of this report, the terminal station 22 determines that the control station 11 has completed its transmission, and then uses a time period from the time of reception of the report to a time T5 for transmitting its data frame. Also, the terminal station 21 completes its data frame transmission at a time T7', which is earlier than the end of its allocated time T7, and then transmits a transmission-completed frame reporting the completion. Upon reception of this report, the terminal station 23 determines that the terminal station 21 has completed its transmission, and then uses a time period starting at the time of reception of the report and ending at a time T9 for transmitting its data frame.

As described above, according to the medium access control system of the third embodiment of the present invention, the idle time not being used for communication can be effectively used for improving communication efficiency.

In some cases, it may not be desired to change the transmission timings of some of the stations or the streams. For example, as is the case of VoIP, in an application required to transmit data always at predetermined intervals, advancing the transmission timing causes inconveniences. In order to cope with such cases, information (category) regarding whether a transmission timing advancing process is enabled (NORMAL) or disabled (FIXED) is managed by the control station 11 or the terminal stations 21 through 2n. If allowed by that information, the transmission timing advancing process is performed on the relevant station or stream. FIG. 22 depicts one example of a schedule frame having described therein whether the advancing process can be performed. This schedule frame is a frame having stored therein information indicative of a time zone in which each of the control station 11 and the terminal stations 21 through 2n can access the network, including a header field and one or more allocation fields each having a combination of an allocation type, the stream identifier, and the transmission time information. Here, the allocation type stores identification information regarding an allocation scheme including the above-described categories of NORMAL or FIXED.

Each of the above-described embodiments is achieved by a CPU interpreting predetermined program data that is stored in a storage device (a ROM, a RAM, a hard disk, etc.) and is capable of causing the above-described processes to be performed. In this case, the program data may be introduced through a recording medium to the storage device, or may be executed directly from the recording medium. The recording medium may be a semiconductor memory, such as a ROM, a RAM, and a flash memory, a magnetic disk memory, such as a flexible disk or a hard disk, an optical disk memory, such as a CD-ROM, a DVD, or a BD, or a memory card. Also, the recording medium may include a communication medium, such as a telephone line or a carrier path.

Also, all or part of the functional blocks forming the control station 11 and the terminal stations 21 through 2n of the present invention are typically achieved by a large-scale integrated (LSI) circuit (called an IC, a system LSI, a super LSI, a ultra LSI, or the like, depending on the degree of integration). Each of the blocks may be formed on one chip, or all or part of the blocks may be formed on one chip.

Also, circuit integration is achieved not only by an LSI but also by a dedicated circuit or a general-purpose processor. Further, a Field Programmable Gate Array (FPGA), which is programmable after manufacturing the LSI, or a reconfigurable processor capable of reconfiguring the connection of circuit cells and the setting inside the LSI can be used.

Furthermore, integration of the functional blocks can be performed by using a new circuit integration technology that would replace the LSI technology with the advance of the semiconductor technology or with the advent of another derivative technology. One possible technology that would be adapted for use is a biotechnological technique.

Figure 23:
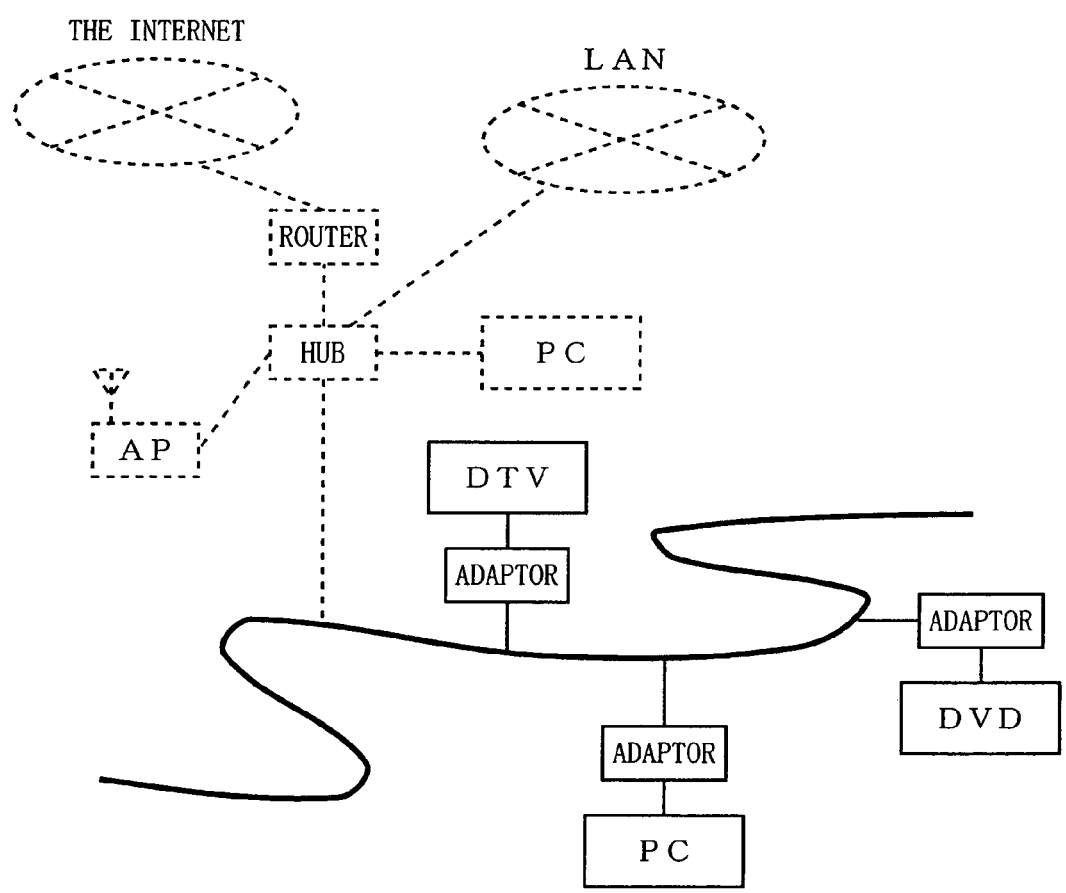
FIG. 23 is an illustration showing one example of a network system in which the medium access control system of the present invention is applied to high-speed power line transmission.

Description is made below to an example in which the present invention described in each of the above embodiments is applied to an actual network system. FIG. 23 is an illustration showing one example of a network system in which the medium access control system of the present invention is applied to high-speed power line transmission. In FIG. 23, via adaptors including the functional modules of the present invention, IEEE 1394 interfaces and USB interfaces included in multimedia devices, such as personal computers, DVD recorders, digital televisions, and home server systems, are connected to a power line. This makes it possible to configure a network system capable of high-speed transmission of digital data, such as multimedia data, with a power line being used as a medium. Unlike the conventional cable LAN, this system can use the power line already installed at home and offices as a network line without newly installing a network cable. Therefore, this system can be achieved at low cost and with easy installation, thereby offering a great convenience.

In the above example, by interposing an adaptor for converting a signal interface of each of the existing multimedia devices to an interface for power line communication, these existing devices are applied to power line communication. In the future, however, with the functions of the present invention being incorporated in the multimedia devices, data transmission among the devices can be performed via a power supply code of each of the multimedia devices. In this case, no adaptors, IEEE 1394 cables, or USB cables are required, thereby simplifying wiring. Also, connection to the Internet via a router and connection to a wireless/cable LAN using a hub or the like can be made, thereby making it possible to extend a LAN system using the high-speed power line transmission system of the present invention. Furthermore, in the power line transmission scheme, the communication data flows via the power line. Therefore, it is possible to prevent the problem of interception of radio waves which would lead to leakage of data. This power line transmission scheme is also effective for data protection in view of security. As a matter of course, data flowing through the power line is protected by, for example, IPsec in the IP protocol, encryption of the contents, other DRM schemes, etc.

As has been described above, by implementing QoS functions including a copyright protecting function achieved by encryption of the contents and the effects of the present invention (improvement in throughput and flexible adaptation of band allocation responsive to an increase in re-transmission or a traffic change), high-quality transmission of AV contents using the power line can be performed.

While the invention has been described in detail, the foregoing description is in all aspects illustrative and not restrictive. It is understood that numerous other modifications and variations can be devised without departing from the scope of the invention.

What is claimed is:

1. A medium access control method, for use in a communication network system including a control station for controlling access to a network and a plurality of terminal stations for accessing the network under the control of the control station, and for controlling network access by using a time division technique, the method comprising:

steps performed by the control station of:

generating transmission schedules for a plurality of communications performed in the network, the transmission schedules including information allocating a time zone usable for each of the communications;

generating one schedule frame based on the collected transmission schedules, and including in the schedule frame a number of times of repetition indicative of how many more times the same schedule frame is successively transmitted;

transmitting the generated schedule frame to the plurality of the terminal stations in predetermined cycles; and performing a communication in a time zone which is allocated to the control station, and steps performed by each of the plurality of the terminal stations of:

receiving the schedule frame transmitted by the control station;

performing, when the schedule frame cannot be received, the schedule frame based on the number of times of repetition included in the schedule frame previously received;

determining, based on the schedule frame, a terminal station's own time zone in which communication can be performed; and performing the communication in the determined time zone.

2. The medium access control method according to claim 1, wherein the transmission schedule includes a stream identifier for identifying a stream and transmission time information for indicating a time zone in which the stream identified by the stream identifier is allowed to be transmitted.

3. The medium access control method according to claim 2, wherein the transmission time information is a transmission end time.

4. A medium access control method for controlling network access by using a time division technique, the method comprising steps of:
- generating a transmission schedule for a plurality of communications performed in the network, the transmission schedule allocating a time period to each of the communications;
- generating a schedule frame, the schedule frame including the transmission schedule and a number of repetitions of the transmission schedule; and
- performing, when a new schedule frame cannot be received, said plurality communications indicated in the transmission schedule based on the number of repetition of the transmission schedule previously received.

5. A control station for controlling access by a plurality of terminal stations to a network by using a time division technique, the control station comprising:
- a schedule generating section for generating transmission schedules for a plurality of communications performed in the network, the transmission schedules including information allocating a time zone usable for each of the communications;
- a frame transmission section for collecting the transmission schedules generated by the schedule generating section into one schedule frame, including in the schedule frame a number of times of repetition indicative of how many more times the same schedule frame is successively transmitted, and transmitting the schedule frame to the plurality of the terminal stations in predetermined cycles; and
- a communication control section for performing communication in a time zone which is allocated to the control station.

6. The control station according to claim 5, wherein the transmission schedule includes a stream identifier for identifying a stream and transmission time information for indicating a time zone in which the stream identified by the stream identifier is allowed to be transmitted.

7. The control station according to claim 6, wherein the transmission time information is a transmission end time.

8. A terminal station for accessing a network under the control of a control station, the terminal station comprising:
- a frame receiving section for receiving, from the control station, a schedule frame which has collected therein transmission schedules that are generated for a plurality of communications performed in the network and include information allocating a time zone usable for each of the communications, and which also includes a number of times of repetition indicative of how many more times the same schedule frame is successively transmitted;
- a schedule processing section for performing, when the schedule frame cannot be received, the schedule frame based on the number of times of repetition included in the schedule frame previously received; and
- a communication control section for determining, based on the schedule frame, a terminal station's own time zone in which communication can be performed, and performing the communication in the determined time zone.

9. The terminal station according to claim 8, wherein, when the schedule frame cannot be received in a time period based on the number of times of repetition, the communication control section determines the terminal station's own time zone in which communication can be performed based on the schedule frame last received.

* * * * *